(12) United States Patent
Viswanathan et al.

(10) Patent No.: US 11,683,387 B1
(45) Date of Patent: Jun. 20, 2023

(54) APPARATUS AND METHODS FOR REAL-TIME RENDERING OF ZERO-BYTE CUSTOMIZED SOFTWARE ON A CLIENT STATION

(71) Applicant: Bank of America Corporation, Charlotte, NC (US)

(72) Inventors: Krithika Viswanathan, Chennai (IN); Amit Mishra, Chennai (IN); Rajat Singla, Noida (IN); Subburathinam Krishnan, Chennai Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/717,298

(22) Filed: Apr. 11, 2022

(51) Int. Cl.
*G06F 9/44* (2018.01)
*H04L 67/00* (2022.01)
*G06F 8/70* (2018.01)
*G06F 8/20* (2018.01)

(52) U.S. Cl.
CPC ............. *H04L 67/34* (2013.01); *G06F 8/20* (2013.01); *G06F 8/70* (2013.01)

(58) Field of Classification Search
CPC ............. H04L 67/34; G06F 8/20; G06F 8/70

USPC .......................................... 717/104, 110, 122
See application file for complete search history.

(56) References Cited

U.S. PATENT DOCUMENTS

2019/0171438 A1* 6/2019 Franchitti ............. G06N 20/00
2022/0383134 A1* 12/2022 Ghosh .................. G06N 5/045

* cited by examiner

*Primary Examiner* — Chuck O Kendall
(74) *Attorney, Agent, or Firm* — Weiss & Arons LLP; Michael A. Springs

(57) ABSTRACT

Apparatus and methods are provided for providing zero-(permanent) byte real-time customized software to a user's client station. A user may request real-time customized software from one channel. The request may be transmitted to a server and analyzed to determine an intent for the customized software. The intent may be matched to one or more features in a feature catalog and an appropriate target output channel may be determined. A feature bundler may extract source code corresponding to the feature(s) and output channel, compile the code and transmit the customized software to the target output channel. The target output channel may execute the customized software within a container and delete the software when a deletion condition is satisfied, such as after the user finishes using the software.

20 Claims, 6 Drawing Sheets

APPARATUS AND METHODS FOR REAL-TIME RENDERING OF ZERO-BYTE CUSTOMIZED SOFTWARE ON A CLIENT STATION

FIELD OF TECHNOLOGY

This application provides apparatus and methods for providing, in real-time, zero-permanent byte customized software on a user station.

BACKGROUND

Generally, an entity's capability to respond electronically to a customer or user request may be confined to an input/output channel's pre-installed software. For example, a financial institution may only be capable of providing a customer the option to transfer money, between accounts via the customer's smartphone if the customer has the financial institution's bespoke application installed on their smartphone. Alternatively, if a customer is at an automated teller machine ("ATM"), the customer will be limited in types and numbers of transactions by the ATM's software. As the various requests or features a customer/user desires increase, the larger and more expansive the pre-installed software must be. However, more features and more channels (e.g., different operating systems) may include the possibility for increased errors and bugs, among other limitations.

Pre-installed software which is channel and platform dependent may have certain limitations, including, inter alia: 1) it needs to be natively installed/supported by the underlying environment before it can run; 2) its feature support is restricted by the underlying channel (mobile, desktop, ATM etc.) and within the channel the capabilities are restricted to the platform (android, IOS, windows, other operating system etc.); 3) any fault or error in the software or the environment renders the channel unserviceable for user operations; 4) after installation, the software may use the underlying channel's privacy policy to access a user's personal information; 5) if the device/channel is stolen or lost, the software and information may be exposed to a malicious third-party; and 6) as the software is static and always available on the channel, the software may be at increased risk to malicious activity, and the more a malicious actor has access to a particular program, the more time may be available to defeat any security.

Currently, there is no apparatus or method available to provide real-time rendering of channel agnostic customized software that is not permanently installed on a channel (i.e., the software uses zero bytes of the channel's memory in the long term).

Therefore, it would be desirable to provide apparatus and methods to provide real-time, channel agnostic, zero-byte customized software to a user.

SUMMARY OF THE DISCLOSURE

It is an object of this disclosure to provide apparatus and methods for providing real-time zero-permanent byte customized software to a user on a user station.

An apparatus for providing real-time customized software to a user on a distinct client station is provided. The apparatus may include a request originating channel that may be configured to transmit a request from the user for real-time customized software. The request may be transmitted to a server.

The apparatus may include a database. The database may be at a server or a location remote from the server. The database may include a central feature catalog and a store of source code.

The apparatus may include a server. The server may include a communication link, a processor, and a non-transitory memory. The non-transitory memory may be configured to store, at least, an operating system, a request intent extractor, an intelligent feature processor, and a multi-module real-time intelligent feature bundler.

The apparatus may include two or more output channels. Each of the two or more output channels may be configured to, at least: receive the real-time customized software, execute the real-time customized software within a plugin-code container installed on the output channel, and delete the real-time customized software after a deletion condition is satisfied.

The request intent extractor may be configured to determine an intent for the real-time customized software requested by the user.

The intelligent feature processor may be configured to, at least: determine which one or more features located within the central feature catalog may correspond with the intent for the real-time customized software requested by the user, determine an identification of one of the two or more output channels that may correspond with the intent for the real-time customized software and the one or more features within the central feature catalog, and transmit the one or more features and the identification of the output channel to the multi-module real-time intelligent feature bundler.

The multi-module real-time intelligent feature bundler may be configured to, at least: receive the one or more features and the identification from the intelligent feature processor, extract source code that may correspond to the one or more features and the identification of the output channel from the store of source code, bundle the extracted source code to create the real-time customized software, and transmit the real-time customized software to the identified output channel.

In an embodiment, the real-time customized software may be encrypted. The plugin-code container may have the capability to decrypt the real-time customized software.

In an embodiment, the request originating channel and the identified output channel may be distinct and separate channels. In another embodiment, the request originating channel and the identified output channel may be the same channel. For example, one channel may be an ATM and another may be a smartphone, or both may be the same smartphone.

In an embodiment, the request intent extractor may be configured to use one or more artificial intelligence/machine learning ("AI/ML") algorithms.

In an embodiment, the intelligent feature processor may be configured to use one or more artificial intelligence/machine learning ("AI/ML") algorithms.

In an embodiment, the multi-module real-time intelligent feature bundler may be configured to use one or more artificial intelligence/machine learning ("AI/ML") algorithms.

In an embodiment, the plugin-code container may be a smartphone application.

In an embodiment, the deletion condition may be the user exiting the plugin-code container.

In an embodiment, the distinct client station may be the request originating channel.

In an embodiment, the distinct client station may be one of the two or more output channels.

In an embodiment, one of the two or more output channels may be a smartphone belonging to the user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
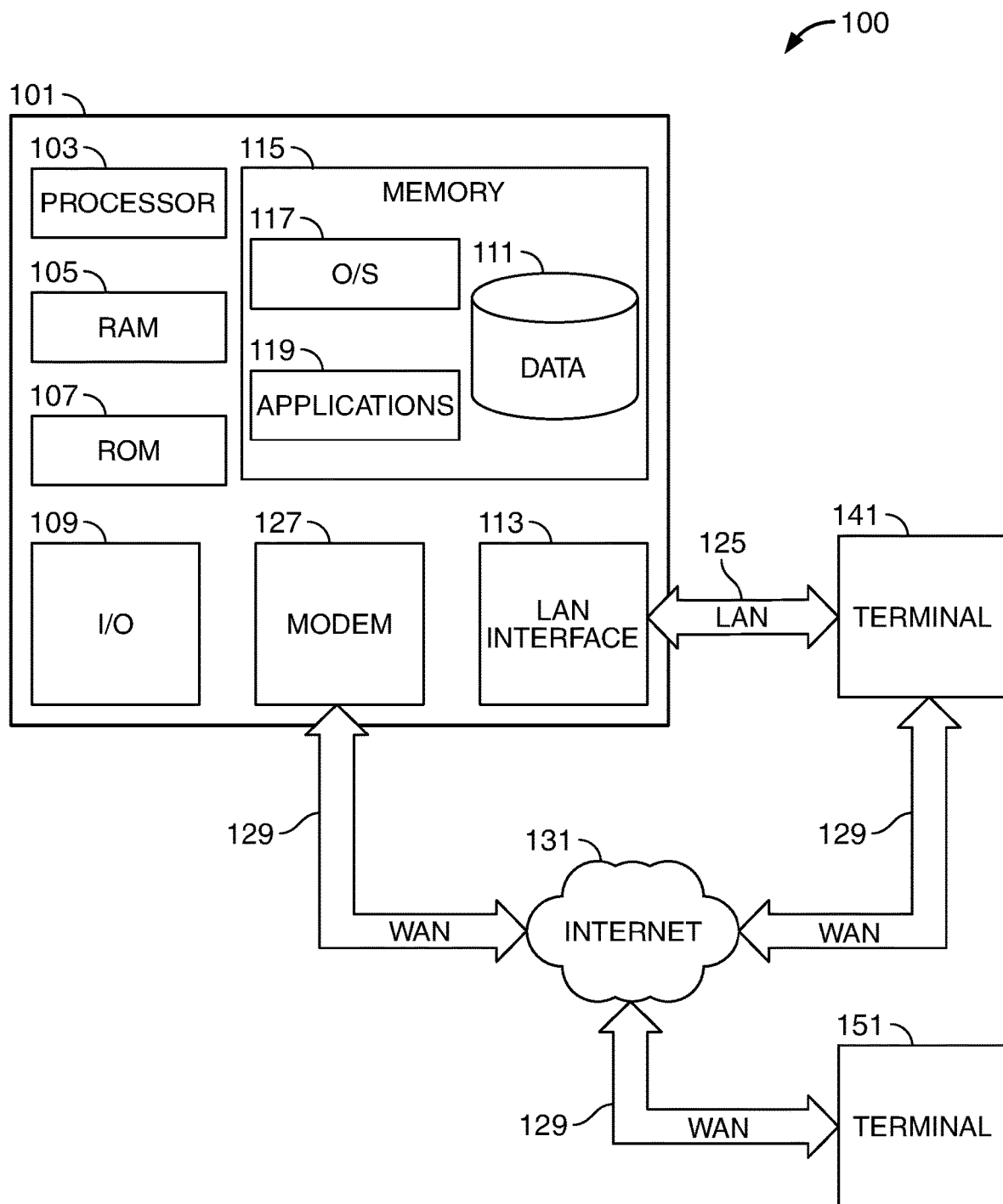
FIG. 1 shows illustrative apparatus in accordance with principles of the disclosure.

An apparatus for providing real-time customized software to a user on a distinct client station is provided. In this disclosure, a client station may refer to a user station, a user computer, a user device, and an output channel. The real-time customized software may be bespoke software adapted to the requirements of a specific and particular user. The apparatus, as described in this disclosure, may provide the customized software to the user in real-time. Real-time may include a particular time limit or may refer to producing and providing the software upon request.

The apparatus may include a request originating channel. A channel may refer to a physical computing device (e.g., a mobile phone, tablet, desktop, ATM etc.), A platform may refer to a particular operating system on a channel (e.g., android, IOS, windows, other operating system etc.). The request originating may be configured to transmit a request from the user for real-time customized software. The request may be transmitted to a server or other computing device. The request may include specific details on particular features the user desires (e.g., the feature to transfer money between accounts, or make a deposit, or make a withdrawal, etc.) or the request may be broader. The request may be in any suitable format, such as text, voice, gestures, and video, etc.

The apparatus may include a database. The database may include a central feature catalog and a store of source code. The source code may correspond with the feature catalog. For example, for every feature in the catalog, the source code repository may include source code to implement that feature on one or more channels and platforms. Some source code may be channel or platform agnostic. The agnosticity of the source code may depend on the channel or platform (e.g., a snippet of source code may function on three platforms, but not every platform). The more channels and platforms, as well as features, supported by the apparatus, the larger the database may be. An entity may choose to limit the size of the database by limiting support for features, channels, and/or platforms.

The database may sort files in any appropriate method. The database may be at a server or a location remote from the server. When the database is located at or near the server, the apparatus may be able to produce customized software faster than if the database is remote from the server.

In an embodiment, the server or database may include artificial intelligence/machine learning ("AI/ML") algorithms configured to create new source code for a particular channel or platform. The new source code may be stored in the database.

In an embodiment, the AI/ML, algorithm(s) may be tasked to periodically expand the store of source code to include new features, channels or platforms.

The apparatus may include a server. The server may be centralized or distributed. The server may include a communication link, a processor, and a non-transitory memory. Other components, such as an input/output module, and a display, may be included.

The non-transitory memory may be configured to store, at least, an operating system, a request intent extractor, an intelligent feature processor, and a multi-module real-time intelligent feature bundler. Each of the above modules and applications may be configured to be executed on the processor.

The request intent extractor may be configured to determine an intent for the real-time customized software requested by the user. The request intent extractor may use natural language processing or other suitable algorithms to parse the user request and determine one or more intents. For example, a user may be at an ATM and say, "I want to give money to Jane Smith," or type into the ATM, "I want to transfer money from account A to account B." The first example may require more computation to determine intent, while the second example may require less computational power by the request intent extractor.

The intelligent feature processor may be configured to perform multiple functions. The intelligent feature processor may determine which one or more features located within the central feature catalog may correspond with the intent for the real-time customized software requested by the user. For example, if the intent is to transfer money, a corresponding feature may be the ability to transfer funds from one account to a particular account, which may be associated with an email address or phone number. Other standard features of payment applications (such as receiving money or checking balances) may be useless for a particular intent, and therefore, they may be excluded from the final version of the customized software.

The intelligent feature processor may also determine an identification of one of two or more output channels that may correspond with the intent for the real-time customized software and the one or more features within the central feature catalog. The intelligent feature processor may analyze the request and feature and determine the more appropriate output channel. In an embodiment, only one output channel may be appropriate. The appropriateness of an output channel may be feature dependent, may be dependent on user preference, or may be dependent on output channel availability. For example, a particular feature may only be available on an ATM output channel. Or a feature may be available on two channels, but the user has indicated a preference for one of the two channels. Or, a feature may be available on all channels, but only one channel indicates, through a channel health feed, that it is capable of accepting new programs at the time needed. For example, only one channel may be able to communicate with the server, and the other channels are unavailable. All of these considerations above, as well as any other pertinent consideration, may be analyzed by the intelligent feature processor to determine the appropriate output channel.

In an embodiment, the intelligent feature processor may determine that no output channel is available for the requested features. The intelligent feature processor may inform the user that no output channel is available.

The intelligent feature processor may also transmit the one or more features and the identification of the output channel to the multi-module real-time intelligent feature bundler.

The multi-module real-time intelligent feature bundler may be configured to receive the one or more features and the identification from the intelligent feature processor. After receipt, the feature bundler may extract source code from the source code store/repository that may correspond to the one or more features and the identification of the output channel. Table 1 below displays some of the various permutations possible for three different channels (1, 2, or 3) and three different features (X, Y, and Z). For this number of features and channels, the source code store may have up to 49 different source codes, as shown in Table 1. One source code snippet may include all three features and work in all three channels (bottom right corner, XYZ123). For illustrative purposes, channel 1 may be an ATM, channel 2 a smartphone, and channel 3 a desktop computer. As an example, when the intelligent feature processor determines that the user has requested features X and Y and the appropriate output channel is an ATM, the feature bundler may extract source code XY1 from the source code store. Additional features (not shown), such as a graphical user interface ("GUI") or touch screen interface, may be common to all features X, Y, and Z, but may also be channel and platform dependent.

TABLE 1

| Channel: Feature | 1 | 2 | 3 | 12 | 13 | 23 | 123 |
|---|---|---|---|---|---|---|---|
| X | X1 | X2 | X3 | X12 | X13 | X23 | X123 |
| Y | Y1 | Y2 | Y3 | Y12 | Y13 | Y23 | Y123 |
| Z | Z1 | Z2 | Z3 | Z12 | Z13 | Z23 | Z123 |
| XY | XY1 | XY2 | XY3 | XY12 | XY13 | XY23 | XY123 |
| XZ | XZ1 | XZ2 | XZ3 | XZ12 | XZ13 | XZ23 | XZ123 |
| YZ | YZ1 | YZ2 | YZ3 | YZ12 | YZ13 | YZ23 | YZ123 |
| XYZ | XYZ1 | XYZ2 | XYZ3 | XYZ12 | XYZ13 | XYZ23 | XYZ123 |

The feature bundler may then bundle the extracted source code to create the real-time customized software, and transmit the real-time customized software to the identified output channel(s).

In an embodiment, the feature bundler may test the real-time customized software in a virtual machine or virtual environment, before, after, or while transmitting the real-time customized software to the output channel. Testing the real-time customized software may increase the success rate of the software performing satisfactorily as well as increasing customer/user satisfaction with the customized software. However, testing the customized software may increase the time preparing the software.

The apparatus may include two or more output channels. Multiple output channels may be more secure as well as give the user more choices. Each of the two or more output channels may be configured to receive the real-time customized software. Each output channel may be configured to execute the real-time customized software within a plugin-code container installed on the output channel. The plugin-code container may be configured to install, run/execute, and delete the real-time customized software while leaving the container intact. The plugin-code container may be an application or other software program. As the real-time customized software may be deleted after use or another deletion condition is met, the plugin-code container may remain on the channel. The plugin-code container may be configured to execute any real-time customized software.

Each output channel may be configured to delete the real-time customized software after a deletion condition is satisfied. As the real-time customized software is deleted after use (or other deletion condition), it may be referred to as a zero-byte solution, as the real-time customized software will consume zero-bytes of the output channel's non-transitory memory over time. Any appropriate deletion condition may be used.

In an embodiment, the real-time customized software may be encrypted. The plugin container may have the capability to decrypt the real-time customized software. Encryption may increase the security of the real-time customized software. Any suitable encryption method may be used.

In an embodiment, the request originating channel and the identified output channel may be distinct and separate channels. For example, the user may call a call center using a smartphone and request a particular service or feature. The call center agent (which may be automated, as in an interactive voice response ("IVR") system), may forward the request to the apparatus. The intelligent feature processor may analyze the request and other factors and determine that the output channel to satisfy the user's request may be an ATM near the user.

In another embodiment, the request originating channel and the identified output channel may be the same channel. For example, both may be the same smartphone.

In an embodiment, the various modules of the apparatus, including the request intent extractor, the intelligent feature processor, the multi-module real-time intelligent feature bundler, and the plugin-code container each may be configured to use one or more artificial intelligence/machine learning ("AI/ML") algorithms. The AI/ML algorithms may be the same or different within each module.

In an embodiment, the plugin-code container may be a smartphone application, computer application, a backend application, a visible application, a script, a runtime application, or other suitable software application.

In an embodiment, the deletion condition may be the user exiting the plugin-code container, the user exiting the real-time customized software, a pre-determined time limit, a modifiable time-limit, the real-time customized software generating an error message, the user transmitting a second request for real-time customized software, the fulfillment of a condition within the real-time customized software, or other deletion condition.

A method for providing real-time customized software to a user on a distinct client station is provided. The method may include transmitting a request from the user from a request originating channel to a server. The method may include extracting, by a request intent extractor module located on the server, one or more intent(s) for the real-time customized software from the request. The method may include determining, by an intelligent feature processor module located on the server, which one or more features present within a central feature catalog may correspond with the intent(s). The method may include determining, by the intelligent feature processor module, a target output channel identification that may correspond with the intent(s) and the one or more features. The method may include transmitting, from the intelligent feature processor module, the one or more features and the target output channel identification to a real-time intelligent feature bundler module located on the server.

The method may include receiving, by the real-time intelligent feature bundler module, the one or more features and the target output channel identification. The method may include extracting, by the real-time intelligent feature bundler module, source code corresponding to the one or more features and the target output channel identification from a store of source code. The method may include bundling, by the real-time intelligent feature bundler module, the extracted source code to form the real-time customized software.

The method may include transmitting, from the server, the real-time customized software to the target output channel. The method may include executing, by the target output channel, the real-time customized software within a plugin-code container. The method may include deleting the real-time customized software after a deletion condition is satisfied.

In an embodiment, the intelligent feature processor module may determine a target output channel by analyzing a channel health feed and a channel preference predictor module.

In an embodiment, the real-time intelligent feature bundler module may bundle the extracted source code to form the real-time customized software by utilizing an intelligent channel code adaptor.

In an embodiment, the request intent extractor module may be configured to use one or more artificial intelligence/machine learning ("AI/ML") algorithms.

In an embodiment, the intelligent feature processor module may be configured to use one or more artificial intelligence/machine learning ("AI/ML") algorithms.

In an embodiment, the real-time intelligent feature bundler module may be configured to use one or more artificial intelligence/machine learning ("AI/ML") algorithms.

An apparatus for providing real-time customized software to a user on a distinct client station is provided. The apparatus may include a database. The database may include a central feature catalog and a store of source code. The apparatus may include a server. The server may include a communication link, a processor, and a non-transitory memory. The non-transitory memory may be configured to store at least: an operating system, a request intent extractor, an intelligent feature processor, a distributed ledger module, and a multi-module real-time intelligent feature bundler. The apparatus may also include two or more output channels configured to receive the real-time customized software, execute the real-time customized software within a plugin-code container, and delete the real-time customized software after a deletion condition is satisfied.

The user may transmit a request for real-time customized software to the server. The request intent extractor may be configured to determine one or more intent(s) for the real-time customized software requested by the user. The intelligent feature processor may be configured to: determine which one or more features located within the central feature catalog may correspond with the intent for the real-time customized software requested by the user, determine an identification of one of the two or more output channels that may correspond with the intent for the real-time customized software and the one or more features within the central feature catalog by analyzing an output channel health feed and a channel preference predictor, and transmit the one or more features and the identification of the output channel to the multi-module real-time intelligent feature bundler.

The multi-module real-time intelligent feature bundler may be configured to: receive the one or more features and the identification, extract source code that may correspond to the one or more features and the identification from the store of source code, bundle the extracted source code and adapt the source code to the identified output channel through an intelligent channel code adaptor to create the real-time customized software, log the real-time customized software and the identified output channel on the distributed ledger, and transmit the real-time customized software to the identified output channel.

In an embodiment, the deletion condition may be one of the following: the user exiting the container; the user exiting the real-time customized software; a pre-determined time limit; a modifiable time-limit; the real-time customized software generating an error message; or the user transmitting a second request for real-time customized software.

In an embodiment, the distributed ledger may be a blockchain.

Various protocols for wired or wireless communication may be used by the apparatus. The communication link may provide Wi-Fi, Near Filed Communication ("NFC"), cellular (including 5g), Bluetooth or any other suitable mode of wired or wireless communication. Wi-Fi may include passive Wi-Fi having lower power consumption than typical Wi-Fi.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with any computing device where the user may attempt to authenticate from as well as any server or servers. The communication link may include any necessary hardware (e.g., antennae) and software to control the link. Any appropriate communication link may be used. In an embodiment, the network used may be the Internet. In another embodiment, the network may be an internal intranet.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 is a block diagram that illustrates a computing device/apparatus 100 that may be used in accordance with the principles of the invention. The device 101 may have a processor 103 for controlling overall operation of the device and its associated components, including RAM 105, ROM 107, input/output ("I/O") module 109, and memory 115.

I/O module 109 may include a microphone, keypad, touchscreen, microphone, camera/eye tracker, stylus, or other apparatus through which a user of device 101 may provide input and may also include one or more of a speaker for providing audio output and a video display device for providing textual, audiovisual and/or graphical output. Software may be stored within memory 115 and/or other storage (not shown) to provide instructions to processor 103 for enabling device 101 to perform various functions, such as providing real-time customized software to a user or target output channel. For example, memory 115 may store software used by device 101, such as an operating system 117, application programs 119, and an associated database.

Alternatively, some or all of computer executable instructions of device 101 may be embodied in hardware or firmware (not shown).

Device 101 may operate in a networked environment supporting connections to one or more remote computers or servers, such as terminals 141 and 151. Terminals 141 and 151 may be backend computers, servers, or other channels that include many or all of the elements described above relative to device 101. The network connections depicted in FIG. 1 include a local area network (LAN) 125 and a wide area network (WAN) 129 but may also include other networks.

When used in a LAN networking environment, device 101 is connected to LAN 125 through a network interface or adapter 113.

When used in a WAN networking environment, device 101 may include a modem 127 or other means for establishing communications over WAN 129, such as Internet 131. Bluetooth, cellular, NFC or other communication protocols may also be used.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to utilize the apparatus. Any of various conventional web browsers may be used to display and manipulate data on web pages. It is anticipated that the apparatus may be used to provide real-time customized software to a user.

Additionally, application program 119, which may be used by device 101, may include computer executable instructions for invoking user functionality related to communication, such as email, short message service (SMS), authentication services and voice input and speech recognition applications.

Device 101 and/or terminals 141 or 151 may also be referred to as nodes on a network and may be mobile terminals including various other components, such as a battery, speaker, and antennas (not shown). Terminal 151 and/or terminal 141 may be portable devices such as smart glasses, mobile phones, smart phones, tablet computers, computers, laptops, servers or any other suitable device for providing real-time customized software to a user.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform various functions such as creating and providing real-time customized software to a user or target output channel, and/or performing any other suitable tasks.

In addition to regular computers, the invention may be operational with numerous other general purpose or special purpose computing system environments or configurations, particularly with respect to the server(s). Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, ATMs, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
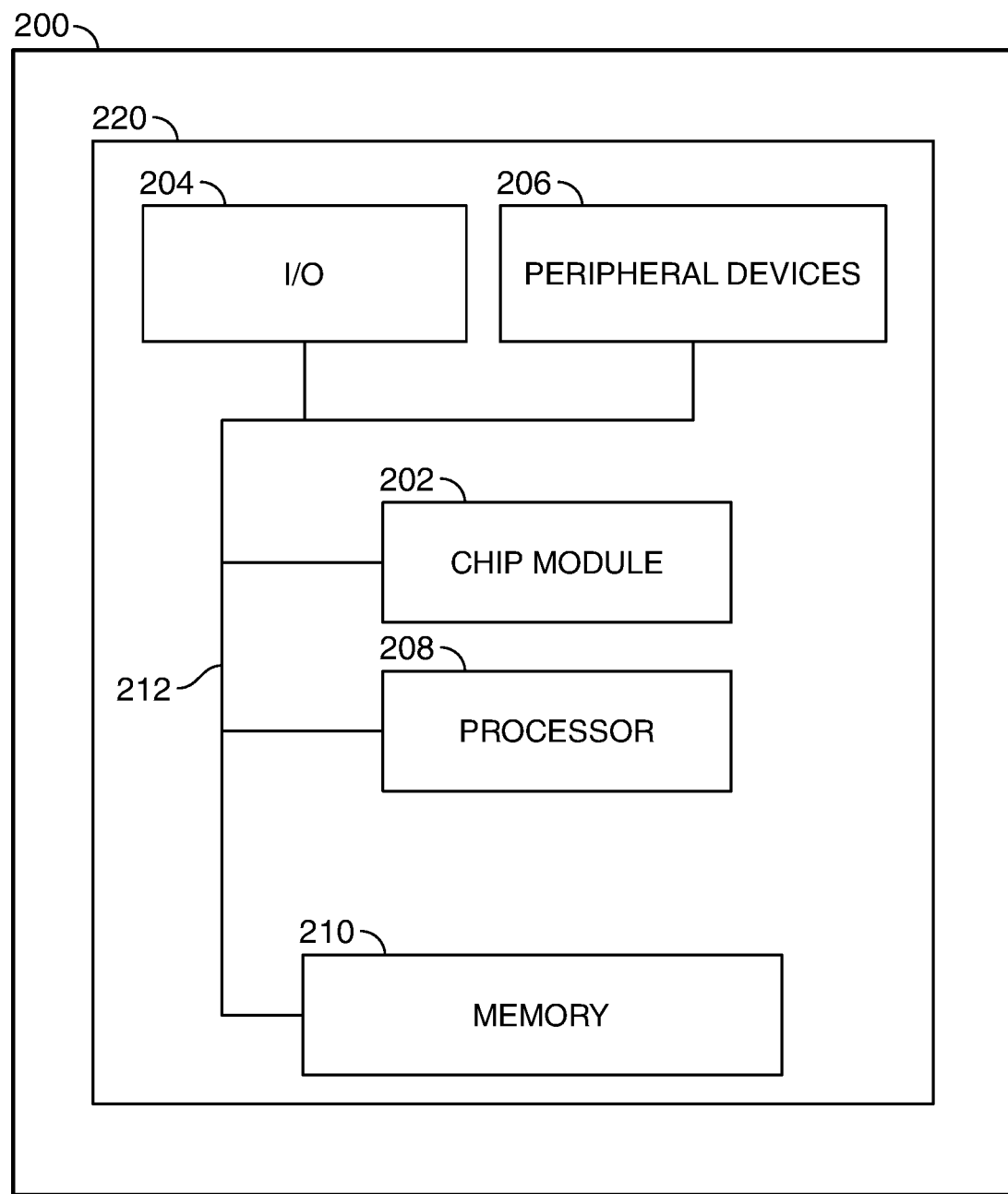
FIG. 2 shows illustrative apparatus in accordance with principles of the disclosure.

FIG. 2 shows an illustrative apparatus 200 that may be configured in accordance with the principles of the invention.

Apparatus 200 may be a computing machine, such as a server. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may run any software application or applications described herein, and machine-readable memory 210.

Machine-readable memory 210 may be configured to store in machine-readable data structures: data, programming functions, units of programming code associated with the programming functions and any other suitable information or data structures.

Components 202, 204, 206, 208 and 210 may be coupled together by a system bus or other interconnections 212 and may be present on one or more circuit boards such as 220.

In some embodiments, the components may be integrated into a single chip. The chip may be silicon-based.

Figure 3:
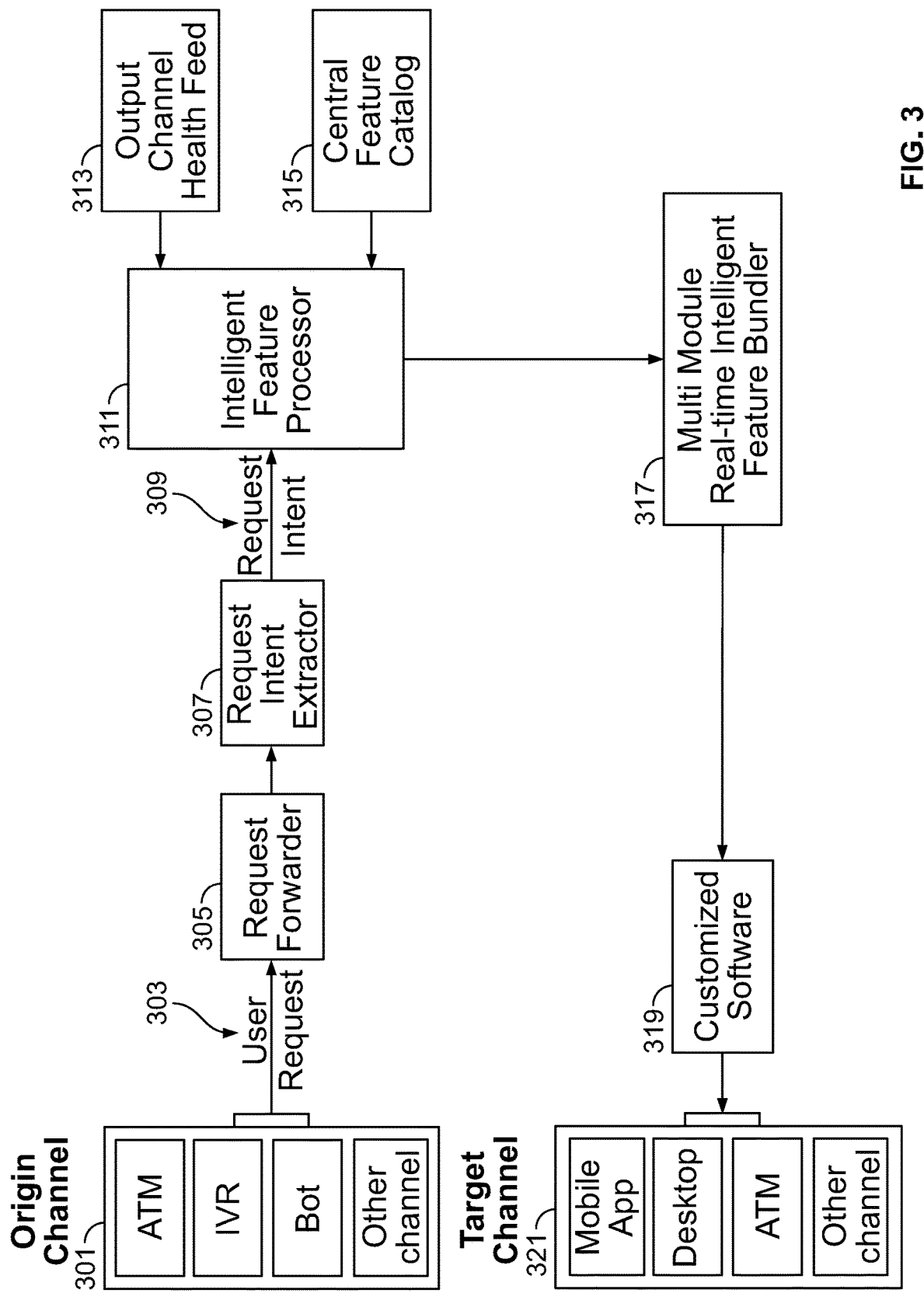
FIG. 3 shows an illustrative schematic in accordance with the principles of the disclosure.

FIG. 3 shows an illustrative schematic in accordance with the principles of the disclosure. Apparatus and information numbered 301-321 may include some or all of the components in FIGS. 1-2, 4, and 6.

An origin channel 301 may be an ATM, an IVR, a chatbot, a computer, a smartphone, a tablet, or other channel. A user request 303 for a real-time customized software may be transmitted from origin channel 301 to a request forwarder 305. The request forwarder 305 may be a component of a server (not shown) or a separate computer. Request forwarder 305 may forward the user request 303 to a request intent extractor 307.

Request intent extractor 307 may analyze the user request 303 and determine one or more intents 309 behind the request 303. For example, the extractor 307 may determine that a user request 303 includes the intent to transfer money from one bank account to another.

The request intent(s) 309 may be transmitted to an intelligent feature processor 311. An output channel health feed 313 and a central feature catalog 315 may be electronically coupled to the intelligent feature processor 311. Output channel health feed 313 and central feature catalog 315 may communicate and provide data to the intelligent feature processor 311. Central feature catalog 315 may be located on a database (not shown). The database may be a part of the same server on which intelligent feature processor 311 is located.

Intelligent feature processor 311 may communicate with the multi-module real-time intelligent feature bundler 317, which may be located on the same server. In an embodiment, intelligent feature processor 311 may transmit one or more features and a target output channel real-time customized software 319 should contain. The feature bundler 317 may extract source code from a source code repository (not shown) and bundle the source code and package it to execute on a target output channel 321. The target output channel 321 may be a mobile phone application, a desktop computer, an ATM, a tablet computer, or other channel.

Figure 4:
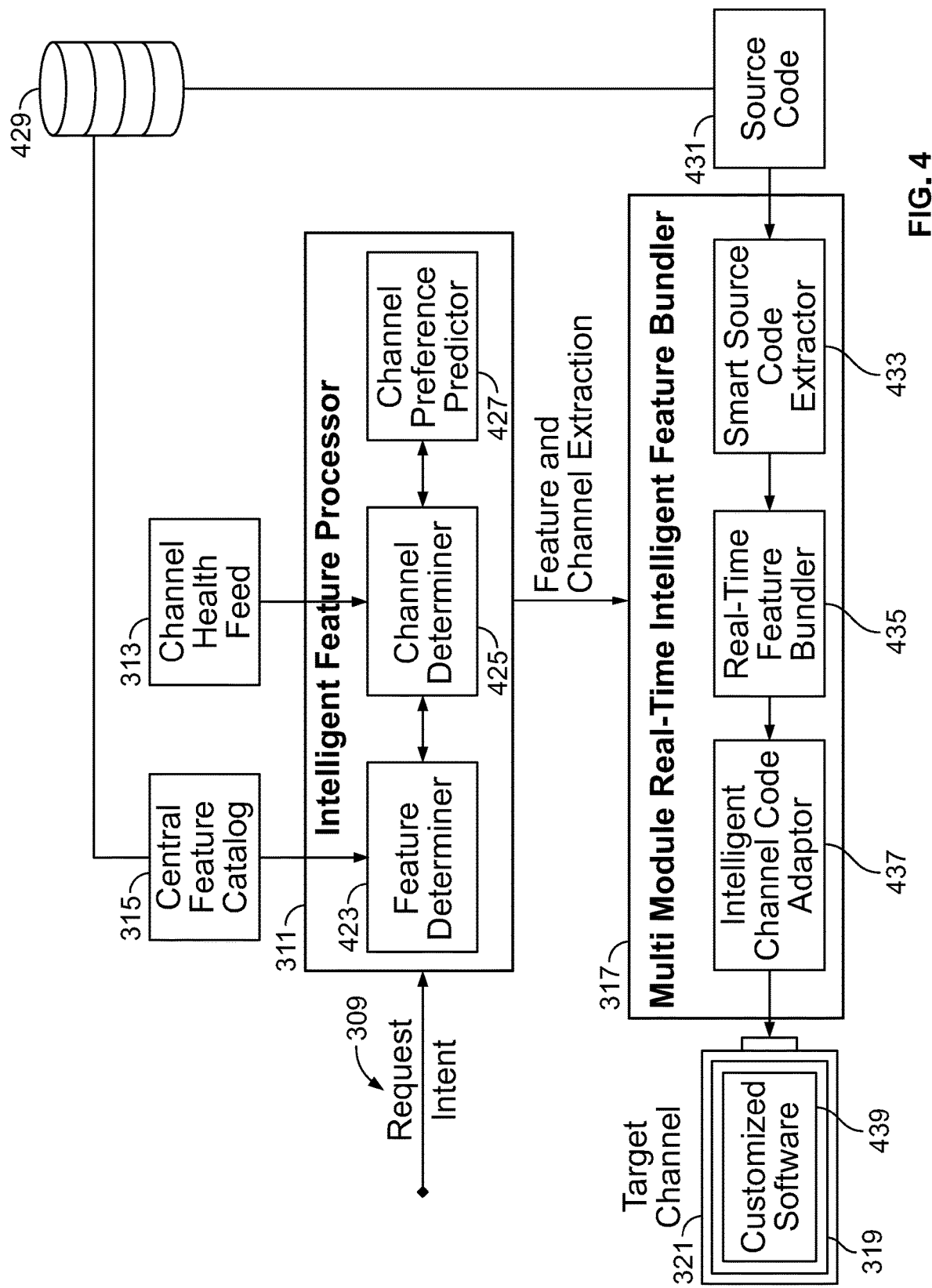
FIG. 4 shows an illustrative schematic in accordance with the principles of the disclosure.

FIG. 4 shows an illustrative schematic in accordance with the principles of the disclosure. Like numbered elements with FIG. 3 are the same elements as in FIG. 3.

Intelligent feature processor 311 may include a feature determiner module 423, a channel determiner module 425 and a channel preference predictor 427, among other modules (not shown). Feature processor 311 may be configured to determine which features correspond with the user's request intent 309 using the feature determiner 423.

Intelligent feature processor 311 may also determine which target output channel would be the most appropriate for the features identified that would satisfy the request intent 309. Feature processor 311 may make this determination utilizing channel determiner 425 and channel preference predictor 427.

Central feature catalog 315 and source code repository 431 may be located in non-transitory memory in database 429.

Intelligent feature processor 311 may transmit one or more features and a target output channel identification to the multi-module real-time intelligent feature bundler 317. Feature bundler 317 may include a smart source code extractor 433, a real-time feature bundler 435, and an intelligent channel code adaptor 437. Feature bundler may form the real-time customized software 319 by extracting source code corresponding to the identified features and identified target output channel 321 from the source code repository 431, bundling/compiling the source code, and adapting the bundled/compiled source code to the identified target output channel 321.

The real-time customized software 319 may be transmitted to the identified target output channel 321 by the multi-module real-time intelligent feature bundler 317. The target output channel 321 may include a plug-in code container 439. The customized software 319 may be executed within the code container 439.

Figure 5:
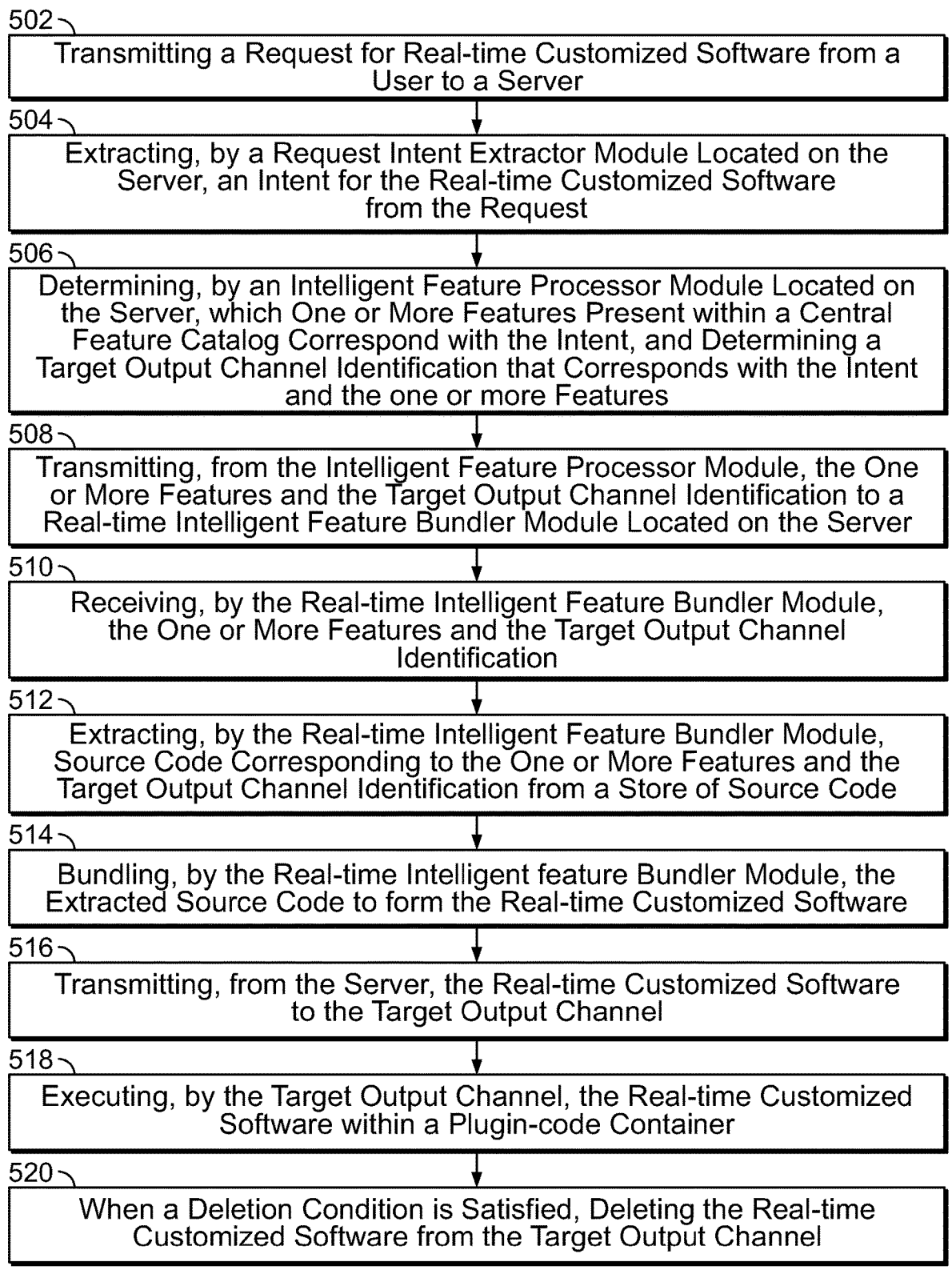
FIG. 5 shows an illustrative flowchart in accordance with the principles of the disclosure.

FIG. 5 shows an illustrative flowchart in accordance with principles of the invention. Methods may include some or all of the method steps numbered 502 through 520. Methods may include the steps illustrated in FIG. 5 in an order different from the illustrated order. The illustrative method shown in FIG. 5 may include one or more steps performed in other figures or described herein. Steps 502 through 520 may be performed on the apparatus shown in FIGS. 1-4 and 6, or other apparatus.

At step 502, a user may transmit a request for real-time customized software to a server. The request may be transmitted from a request originating channel, such as an ATM, a chatbot, an application, an IVR, a computer, a smartphone, or other channel.

At step 504, a request intent extractor module located on the server, may extract an intent for the real-time customized software from the request. The extractor module may process the request to convert it into digital data and then analyze the data to determine one or more intents of the user from the request. For example, if a user states in an IVR, "I want to pay my bills . . . ", the module may process that oral statement through natural language processing or other suitable methods and determine that an intent of the user is to transfer money from the user's account to one or more other accounts or other locations.

At step 506, an intelligent feature processor module located on the server, may determine which one or more features present within a central feature catalog correspond with the intent(s) extracted at step 506. The feature processor may also determine a target output channel identification that corresponds with the intent and the one or more features. For example, if the intent is to transfer money between user accounts, a feature may include that ability, and a target output channel (based on the feature and user preferences) may be a smartphone belonging to the user, or an ATM near the user.

At step 508, the intelligent feature processor module may transmit the one or more features and the target output channel identification to a real-time intelligent feature bundler module located on the server.

At step 510, the real-time intelligent feature bundler module may receive the one or more features and the target output channel identification. At step 512, the feature bundler may extract source code from a source code store/repository, corresponding to the one or more features and the target output channel identification. At step 514, the feature bundler may bundle/compile the extracted source to form the real-time customized software requested by the user. At step 516, the feature bundler module may transmit, from the server, the real-time customized software to the identified target output channel.

At step 518, the target output channel may execute and run the real-time customized software within a plugin-code container located on the target output channel. In an embodiment, the real-time customized software may be streamed to the target output channel and executed on the target output channel.

At step 520, the target output channel may delete the real-time customized software from the output channel when a deletion condition is satisfied. Any deletion condition may be used. Deletion conditions may be variable or static. Deletion conditions may be programmed into the plugin-code container. Deletion conditions may be programmed into the real-time customized software.

Figure 6:
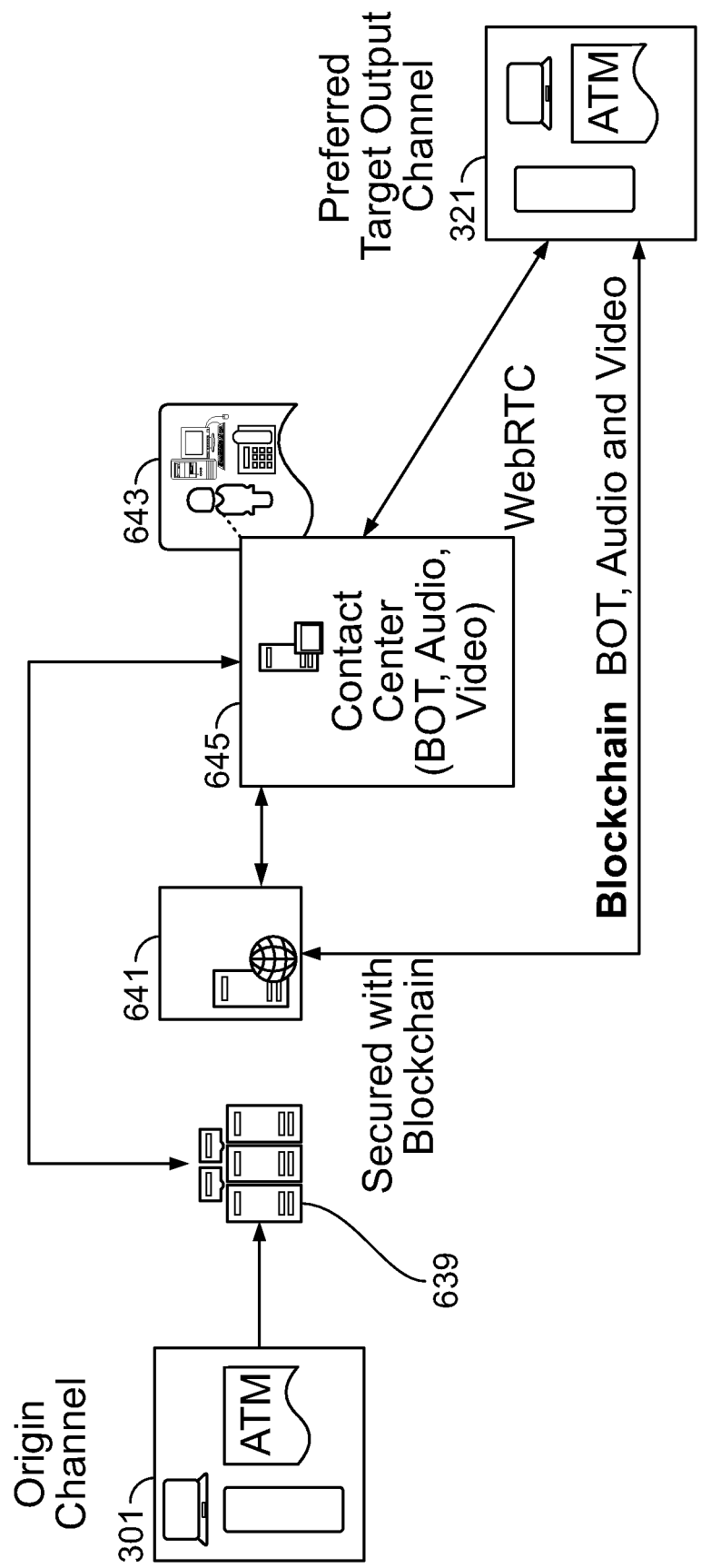
FIG. 6 shows an illustrative schematic in accordance with the principles of the disclosure.

FIG. 6 an illustrative schematic in accordance with the principles of the disclosure. Like numbered elements with FIG. 3 are the same elements as in FIG. 3.

A request originating channel 301, such as a smartphone, computer or ATM may transmit a request for real-time customized software to a server 639. The server 639 may communicate with a contact or call center 645. The request may be handled by an agent 643 at the call center, such as a human, a chatbot (IVR), or other agent automatically. Through software and apparatus as described in this disclosure, located at server 639, real-time customized software may be created and transmitted to a preferred target output channel 321. In an embodiment, the software and entire transaction (request and response) may be stored on a blockchain or other distributed ledger 641.

In an embodiment, a WebRTC protocol, or other suitable protocol may be used to communicate and store data. WebRTC (Web Real-Time Communication) may be referred to as technology that enables Internet applications and websites to capture and optionally stream audio and/or video media, as well as to exchange arbitrary data between browsers without requiring an intermediary. Instead of streaming audio/video, the WebRTC protocol may be adapted to stream real-time customized software that may be executed within a container on the target output channel.

Thus, apparatus and methods to provide real-time customized software to a user have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An apparatus for providing real-time customized software to a user on a distinct client station comprising:
a request originating channel configured to transmit a request from the user for real-time customized software;
a database comprising:
a central feature catalog; and
a store of source code;
a server, the server comprising:
a communication link;
a processor;
a non-transitory memory configured to store at least:
an operating system;
a request intent extractor;
an intelligent feature processor; and
a multi-module real-time intelligent feature bundler; and
two or more output channels configured to:
receive the real-time customized software;
execute the real-time customized software within a plugin-code container; and
delete the real-time customized software after a deletion condition is satisfied; wherein:
the request intent extractor is configured to determine an intent for the real-time customized software requested by the user;
the intelligent feature processor is configured to:
determine which one or more features located within the central feature catalog corresponds with the intent for the real-time customized software requested by the user;
determine an identification of one of the two or more output channels that corresponds with the intent for the real-time customized software and the one or more features within the central feature catalog; and
transmit the one or more features and the identification of the output channel to the multi-module real-time intelligent feature bundler; and
the multi-module real-time intelligent feature bundler is configured to:
receive the one or more features and the identification;
extract source code corresponding to the one or more features and the identification from the store of source code;
bundle the extracted source code to create the real-time customized software; and
transmit the real-time customized software to the identified output channel.

2. The apparatus of claim 1 wherein the real-time customized software is encrypted.

3. The apparatus of claim 1 wherein the request originating channel and the identified output channel are distinct.

4. The apparatus of claim 1 wherein the request intent extractor is configured to use one or more artificial intelligence/machine learning ("AI/ML") algorithms.

5. The apparatus of claim 1 wherein the intelligent feature processor is configured to use one or more artificial intelligence/machine learning ("AI/ML") algorithms.

6. The apparatus of claim 1 wherein the multi-module real-time intelligent feature bundler is configured to use one or more artificial intelligence/machine learning ("AI/ML") algorithms.

7. The apparatus of claim 1 wherein the plugin-code container is a smartphone application.

8. The apparatus of claim 1 wherein the deletion condition is the user exiting the plugin-code container.

9. The apparatus of claim 1 wherein the distinct client station is the request originating channel.

10. The apparatus of claim 1 wherein the distinct client station is one of the two or more output channels.

11. The apparatus of claim 1 wherein one of the two or more output channels is a smartphone belonging to the user.

12. A method for providing real-time customized software to a user on a distinct client station, the method comprising:
transmitting a request from the user from a request originating channel to a server;
extracting, by a request intent extractor module located on the server, an intent for the real-time customized software from the request;
determining, by an intelligent feature processor module located on the server, which one or more features present within a central feature catalog correspond with the intent;
determining, by the intelligent feature processor module, a target output channel identification that corresponds with the intent and the one or more features;
transmitting, from the intelligent feature processor module, the one or more features and the target output channel identification to a real-time intelligent feature bundler module located on the server;
receiving, by the real-time intelligent feature bundler module, the one or more features and the target output channel identification;

extracting, by the real-time intelligent feature bundler module, source code corresponding to the one or more features and the target output channel identification from a store of source code;

bundling, by the real-time intelligent feature bundler module, the extracted source code to form the real-time customized software;

transmitting, from the server, the real-time customized software to the target output channel;

executing, by the target output channel, the real-time customized software within a plugin-code container; and when a deletion condition is satisfied, deleting the real-time customized software from the target output channel.

13. The method of claim 12 wherein the intelligent feature processor module determines a target output channel by analyzing a channel health feed and a channel preference predictor module.

14. The method of claim 12 wherein the real-time intelligent feature bundler module bundles the extracted source code to form the real-time customized software by utilizing an intelligent channel code adaptor.

15. The method of claim 12 wherein the request intent extractor module is configured to use one or more artificial intelligence/machine learning ("AI/ML") algorithms.

16. The method of claim 12 wherein the intelligent feature processor module is configured to use one or more artificial intelligence/machine learning ("AI/ML") algorithms.

17. The method of claim 12 wherein the real-time intelligent feature bundler module is configured to use one or more artificial intelligence/machine learning ("AI/ML") algorithms.

18. An apparatus for providing real-time customized software to a user on a distinct client station comprising:
   a database comprising:
      a central feature catalog; and
      a store of source code;
   a server, the server comprising:
      a communication link;
      a processor; and
      a non-transitory memory configured to store at least:
         an operating system;
         a request intent extractor;
         an intelligent feature processor;
         a distributed ledger module; and
         a multi-module real-time intelligent feature bundler; and two or more output channels configured to:
   receive the real-time customized software;
   execute the real-time customized software within a plugin-code container; and
   delete the real-time customized software after a deletion condition is satisfied; wherein:
the user transmits a request for real-time customized software to the server;
the request intent extractor is configured to determine an intent for the real-time customized software requested by the user;
the intelligent feature processor is configured to:
   determine which one or more features located within the central feature catalog corresponds with the intent for the real-time customized software requested by the user;
   determine an identification of one of the two or more output channels that corresponds with the intent for the real-time customized software and the one or more features within the central feature catalog by analyzing an output channel health feed and a channel preference predictor; and
   transmit the one or more features and the identification of the output channel to the multi-module real-time intelligent feature bundler; and
the multi-module real-time intelligent feature bundler is configured to:
   receive the one or more features and the identification;
   extract source code corresponding to the one or more features and the identification from the store of source code;
   bundle the extracted source code and adapt the source code to the identified output channel through an intelligent channel code adaptor to create the real-time customized software;
   log the real-time customized software and the identified output channel on the distributed ledger; and
   transmit the real-time customized software to the identified output channel.

19. The apparatus of claim 18 wherein the deletion condition is one of the following:
   the user exiting the container;
   the user exiting the real-time customized software;
   a pre-determined time limit;
   a modifiable time-limit;
   the real-time customized software generating an error message; or
   the user transmitting a second request for real-time customized software.

20. The apparatus of claim 18 wherein the distributed ledger is a blockchain.

* * * * *